(12) United States Patent
Oshemkov et al.

(10) Patent No.: US 6,625,181 B1
(45) Date of Patent: Sep. 23, 2003

(54) METHOD AND APPARATUS FOR MULTI-BEAM LASER MACHINING

(75) Inventors: Sergei V. Oshemkov, St. Petersburg (RU); Vladimir Yu. Dmitriev, St. Petersburg (RU); Nicolai N Guletsky, St. Petersburg (RU)

(73) Assignee: U.C. Laser Ltd., Karmiel (IL)

( * ) Notice: Subject to any disclaimer, the term of this patent is extended or adjusted under 35 U.S.C. 154(b) by 299 days.

(21) Appl. No.: 09/694,429

(22) Filed: Oct. 23, 2000

(51) Int. Cl.[7] .............................. H01S 3/10; B23K 26/00
(52) U.S. Cl. .................... 372/9; 219/121.7; 219/121.68
(58) Field of Search ......................... 219/121; 356/237, 356/508, 432

(56) References Cited

U.S. PATENT DOCUMENTS

| 4,950,862 | A | * | 8/1990 | Kajikawa | 219/121.7 |
| 5,517,000 | A | * | 5/1996 | Nishiwaki et al. | 219/121.77 |
| 5,621,521 | A | * | 4/1997 | Takahashi | 356/237 |
| 5,796,112 | A | | 8/1998 | Ichie | |
| 5,805,549 | A | * | 9/1998 | Fite et al. | 369/54 |
| 5,946,130 | A | * | 8/1999 | Rice | 359/349 |
| 5,981,902 | A | * | 11/1999 | Arita et al. | 219/121.68 |
| 6,037,564 | A | * | 3/2000 | Tatah | 219/121.7 |
| 6,037,967 | A | | 3/2000 | Allen et al. | |
| 6,181,472 | B1 | * | 1/2001 | Liu | 359/618 |
| 6,208,424 | B1 | * | 3/2001 | de Groot | 356/500 |
| 6,246,046 | B1 | * | 6/2001 | Landers et al. | 250/216 |
| 6,275,294 | B1 | * | 8/2001 | Folestad | 356/432 |
| 6,377,591 | B1 | * | 4/2002 | Hollister et al. | 372/6 |
| 6,388,737 | B1 | * | 5/2002 | Maeda et al. | 355/67 |

* cited by examiner

Primary Examiner—Paul Ip
Assistant Examiner—Phillip Nguyen
(74) Attorney, Agent, or Firm—Reed Smith LLP; William H. Dippert (57) ABSTRACT

An apparatus for laser machining for optically machining a workpiece. The apparatus comprises a plane polarized primary laser beam source adapted to generate a primary plane polarized light beam; a beam splitter, adapted to split the primary light beam into a plurality of secondary light beams; a light modulator array, comprising an array of individually controllable elements that are each adapted to be set to either allow each beam of the plurality of secondary light beams to traverse through, or effectively block it; a microlens array, comprising an array of microlens elements foci of predetermined lengths, said microlens array elements corresponding to the elements of the light modulator array so that light beam passing through an element of the light modulator array is focused by a corresponding element of the microlens array; and control means adapted to independently switch each of the elements of the light modulator between a transparent and opaque modes in a predetermined manner.

25 Claims, 4 Drawing Sheets

METHOD AND APPARATUS FOR MULTI-BEAM LASER MACHINING

FIELD OF THE INVENTION

The present invention relates to laser technology. More particularly it relates to a method for laser micromachining with a plurality of beams and apparatus thereof.

BACKGROUND OF THE INVENTION

Laser techniques and laser devices have developed remarkably since the invention of the laser (see early patents—the ruby laser device, U.S. Pat. No. 3,353,115, to Maiman, and U.S. Pat. No. 4,053,845 and 4,704,583 to Gould, relating to optically pumped laser amplifiers).

Laser radiation is widely used in a large variety of applications, material processing being a major field of laser use. There are well-known techniques of cutting, welding, drilling of non-transparent materials. A very important field of laser application is the three dimensional structuring of transparent dielectrics, based on the intravolume optical breakdown phenomenon, especially with ultra fast laser radiation.

In U.S. Pat. No. 4,950,862 (Kajikawa), filed in 1989, titled LASER MATCHING APPARATUS USING FOCUSING LENS-ARRAY, there was disclosed a laser beam matching apparatus for finely matching a semiconductor circuit or similar workpiece on a stage. It includes a scanning mirror for directing the beam, scanning lens for converting the beam to a beam substantially perpendicular to the workpiece, lens array unit and mask for focusing the beam, driving means for X-Y movement of the lens array unit and control means for controlling the mirror driving means and stage.

In U.S. Pat. No. 5,517,000 (Nishiwaki et al.), filed in 1994, titled APPARATUS FOR FORMING A WORKPIECE USING PLURAL LIGHT BEAMS, there was disclosed a plurality of elongated beams generated by dividing a laser beam, said plurality of beams being respectively applied to corresponding lens elements of a flyeye lens array. The structure is arranged in such a manner that the diameter of the plurality of the beams in the shorter dimension is made smaller than that of each of the lens elements, so that the plurality of beams is further divided into a plurality of elongated secondary beams by the flyeye lens. The plurality of secondary beams is bundled in a diaphragm in such a manner that their lengthwise directions substantially coincide with each other so that a beam pattern is formed. A row of openings arranged in the lengthwise direction of the beams pattern and formed in the diaphragm member are uniformly and efficiently irradiated with the thus-formed beam pattern. Then, the image of the row of openings is projected onto a plastic plate or the like, so that a multiplicity of holes is formed in the plate. As a result, a nozzle plate of an ink jet printer head can be accurately and quickly manufactured.

In U.S. Pat. No. 5,521,628 (Montgomery), filed in 1993, titled LASER SYSTEM FOR SIMULTANEOUSLY MARKING MULTIPLE PARTS, there was disclosed laser marking systems having increased part throughput, which are obtained by disposing diffractive optics across a primary laser beam. Preferred diffractive optics for high power marking lasers are defined in optical materials with discrete surface levels. This system provides identical and simultaneous marking.

In U.S. Pat. No. 5,656,866 (in den Baumen et al.), filed in 1995, titled APPARATUS FOR LASER MATCHING WITH A PLURALITY OF BEAMS, there was disclosed an apparatus for laser matching by creating a plurality of discrete and separate beams which are sent to a deflecting device including a support and a plurality of individual deflecting elements that act independently and are individually controlled to machine different points on the workpiece simultaneously. It is noted that in the apparatus disclosed in this patent the control of each deflecting element is mechanical, and therefore it is suggested that the response time for each deflecting elements to reorientation command may substantially limit the overall performance of the apparatus.

U.S. Pat. No. 6,037,564 (Tatah), filed in 1998, titled METHOD FOR SCANNING A BEAM AND AN APPARATUS THEREFOR, disclosed a method for directing a light beam to a substrate and an apparatus to do the same. A single light beam is directed to a diffractive element. The diffractive element diffracts the single light beam to form a plurality of light beams. A controller generates a first control signal for controlling a digital micromirror device, which selectively directs each of the plurality of light beams toward or away from the substrate. A lens focuses each selectively directed beam onto the substrate.

BRIEF DESCRIPTION OF THE INVENTION

A main object of the present invention is to increase the productivity of laser-based technologies and improve the quality of laser treatment.

A main aspect of the present invention is to divide a primary laser beam into a plurality of laser beams, each modulated separately and independently, thus achieving multi-tasking performance where each modulated beam carries out a predetermined part of the overall task, and where the plurality of beams perform together the entire task.

Another aspect of the present invention is to modulate the intensity of each one of the beams independently using a light modulator array, as opposed to mechanically controlling each beam, thus gaining faster response times, and hence faster performance.

Yet another aspect of the present invention is to focus each beam on or below the surface of the workpiece by a single element of microlens array. In accordance with the present invention the productivity increase depends on the number of focusing elements and on the primary laser beam intensity. The quality of processing is improved due to the modulation of the laser beam intensity and consequently damage spot size control.

It is therefore thus provided, in accordance with a preferred embodiment of the present invention, an apparatus for laser machining for optically machining a workpiece, the apparatus comprising:

- a plane polarized primary laser beam source adapted to generate a primary plane polarized light beam;
- a beam splitter, adapted to split the primary light beam into a plurality of secondary light beams;
- a light modulator array, comprising an array of individually controllable elements that are each adapted to be set to either allow each beam of the plurality of secondary light beams to traverse through, or effectively block it;
- a microlens array, comprising an array of microlens elements foci of predetermined lengths, said microlens array elements corresponding to the elements of the light modulator array so that light beam passing through an element of the light modulator array is focused by a corresponding element of the microlens array; and control means adapted to independently switch each of the elements of the light modulator between a transparent and opaque modes in a predetermined manner.

Furthermore, in accordance with another preferred embodiment of the present invention, the apparatus further comprises support means for supporting the workpiece during operation.

Furthermore, in accordance with another preferred embodiment of the present invention, the apparatus further comprises repositioning means for repositioning the workpiece, and wherein said control means is also adapted to operate the repositioning means so as to reposition the workpiece between desired positions.

Furthermore, in accordance with another preferred embodiment of the present invention, said repositioning means comprise motor-driven moving stage.

Furthermore, in accordance with another preferred embodiment of the present invention, said motor-driven moving stage is computer-controlled.

Furthermore, in accordance with another preferred embodiment of the present invention, the intensity of the light beams focused by the apparatus on the workpiece is sufficient to cause optical breakdown in the workpiece.

Furthermore, in accordance with another preferred embodiment of the present invention, said laser beam source is a continuous wave laser.

Furthermore, in accordance with another preferred embodiment of the present invention, said laser beam source is a pulsed laser.

Furthermore, in accordance with another preferred embodiment of the present invention, the pulse duration is in the order of $10^{-9}$ seconds or shorter.

Furthermore, in accordance with another preferred embodiment of the present invention, the light modulator array is a LC-based array.

Furthermore, in accordance with another preferred embodiment of the present invention, said LC-based array is computer-controlled.

Furthermore, in accordance with another preferred embodiment of the present invention, the apparatus further comprises beam steering scanner positioned between said light modulator array and microlens array, so as to steer the secondary light beams thus increase the work span of the apparatus.

Furthermore, in accordance with another preferred embodiment of the present invention, said beam steering scanner is a galvanometer scanner.

Furthermore, in accordance with another preferred embodiment of the present invention, said beam steering scanner is a piezo-optical scanner.

Furthermore, in accordance with another preferred embodiment of the present invention, said beam steering scanner is an acousto-optical scanner.

Furthermore, in accordance with another preferred embodiment of the present invention, the microlens array comprises an array of refractive lenses.

Furthermore, in accordance with another preferred embodiment of the present invention, the microlens array comprises an array of diffractive lenses.

Furthermore, in accordance with another preferred embodiment of the present invention, the apparatus is further provided with user interface for inputting user commands to the control means.

Furthermore, in accordance with another preferred embodiment of the present invention, said user interface comprise a keyboard.

Furthermore, in accordance with another preferred embodiment of the present invention, said user interface comprise a touch screen.

Furthermore, in accordance with another preferred embodiment of the present invention, there is provided an apparatus for laser machining for optically machining a workpiece, the apparatus comprising:

a plane polarized laser beam source adapted to generate a primary plane polarized light beam of predetermined polarization;

a beam expander, adapted to expand the primary light beam laterally;

a light modulator array, comprising an array of individually controllable elements that are each adapted to be set to either allow portion of the primary light beam to traverse through, or effectively block them;

a microlens array, comprising an array of microlens elements with foci of predetermined lengths, said microlens array elements corresponding to the elements of the light modulator array so that light beam passing through an element of the light modulator array is focused by a corresponding element of the microlens array; and control means adapted to independently switch each of the elements of the light modulator between transparent and opaque modes in a predetermined manner.

Furthermore, in accordance with another preferred embodiment of the present invention, there is provided a method for laser machining of a workpiece, comprising:

providing a laser beam source;

providing a light modulator array, comprising an array of individually controllable elements that are each adapted to be set to either allow a single beam of plurality of light beams to traverse through, or effectively block it;

providing focusing means for the light beams emerging from the light modulator array;

splitting said laser beam to a plurality of secondary light beams;

irradiating the plurality of secondary light beams onto said light modulator array, and switching each of the elements of the light modulator array between transparent and opaque modes in a predetermined manner; and focusing light beams emerging from said light modulator array on the workpiece.

Furthermore, in accordance with another preferred embodiment of the present invention, the method further comprises repositioning the workpiece in a predetermined manner, so as to increase the processed zone of the workpiece.

Furthermore, in accordance with another preferred embodiment of the present invention, the light beams emerging from said light modulator array are focused on a surface of the workpiece.

Furthermore, in accordance with another preferred embodiment of the present invention, the light beams emerging from said light modulator array are focused within the workpiece.

Furthermore, in accordance with another preferred embodiment of the present invention, the method further comprises further causing optical breakdown by the light beams emerging from said light modulator array.

Furthermore, in accordance with another preferred embodiment of the present invention, the laser beam source is a continuous wave laser.

Furthermore, in accordance with another preferred embodiment of the present invention, said laser beam source is a pulsed laser.

Furthermore, in accordance with another preferred embodiment of the present invention, the method further comprises providing angular steering of the plurality of secondary light beams, so as to increase the work span of these beams.

BRIEF DESCRIPTION OF THE FIGURES

In order to better understand the present invention, and appreciate its practical applications, the following Figures are provided and referenced hereafter. It should be noted that the Figures are given as examples only and in no way limit the scope of the invention as defined in the appending Claims. Like components are denoted by like reference numerals.

DETAILED DESCRIPTION OF THE INVENTION AND FIGURES

The present invention seeks to provide a novel method and apparatus for laser machining characterized by the provision of a plurality of beams each individually controllable, the control means consisting of electronically operable light modulator, so as to allow parallel and yet independent performance of each beam, thus increasing the productivity of the operation.

It is suggested that electronic control yields substantially better and is characterized by better response time than mechanical control, resulting in faster operation times and even more accurate performance.

Figure 1:
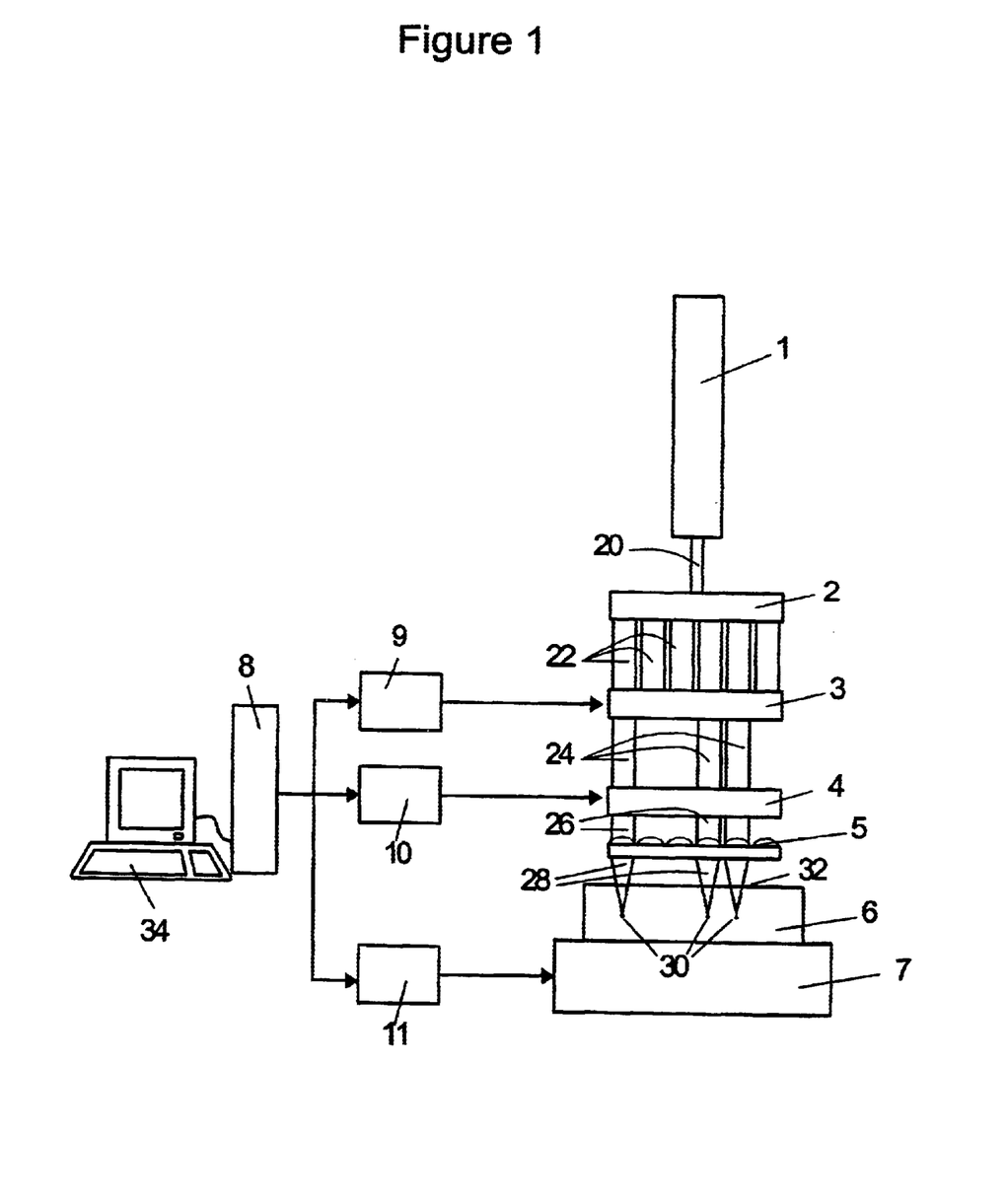
FIG. 1 illustrates a schematic plan of an apparatus for laser machining with individually controllable multiple beams, in accordance with the present invention.

The present invention is hereafter explained with reference to the accompanying figures. Reference is now made to FIG. 1, illustrating a schematic view of an apparatus for laser machining with individually controllable multiple beams, in accordance with the present invention.

The apparatus generally comprises a primary light beam source, beam splitter, light modulator array and focusing lens array.

The Primary light beam source generates a primary light beam 20, having a predetermined polarization (plane polarized light beam), and can be any laser beam source, for example ruby laser, Nd:YAG laser, or any other laser, pulsed or continuous wave (CW) laser. For the purpose of machining by performing optical breakdown it is recommended to employ a Q-switched pulsed Nd:YAG laser (may be obtained from, for example, Lee Laser, Inc., of Orlando Fla., USA, or from Kigre, Inc., of Hilton Head, S.C., USA), with typical pulse duration of up to $10^{-8}$–$10^{-7}$ seconds, and pulse energy of up to 100 mJ or mode-locked picosecond lasers with pulse energy about 1 mJ from Time Bandwidth of Zurich, Switzerland, or femtosecond amplified systems with pulse energy about 1 mJ from Clark MXR, Dexter, Mich., USA. A beam splitter 2 is provided in front of the primary light beam source 1, for the purpose of splitting the primary light beam 20 into a predetermined plurality of secondary beams 22, arranged in a two dimensional array.

The beam splitter may be any type of beam splitters, such as a diffractive beam splitter, birefringence beam splitter or the like.

Figure 2:
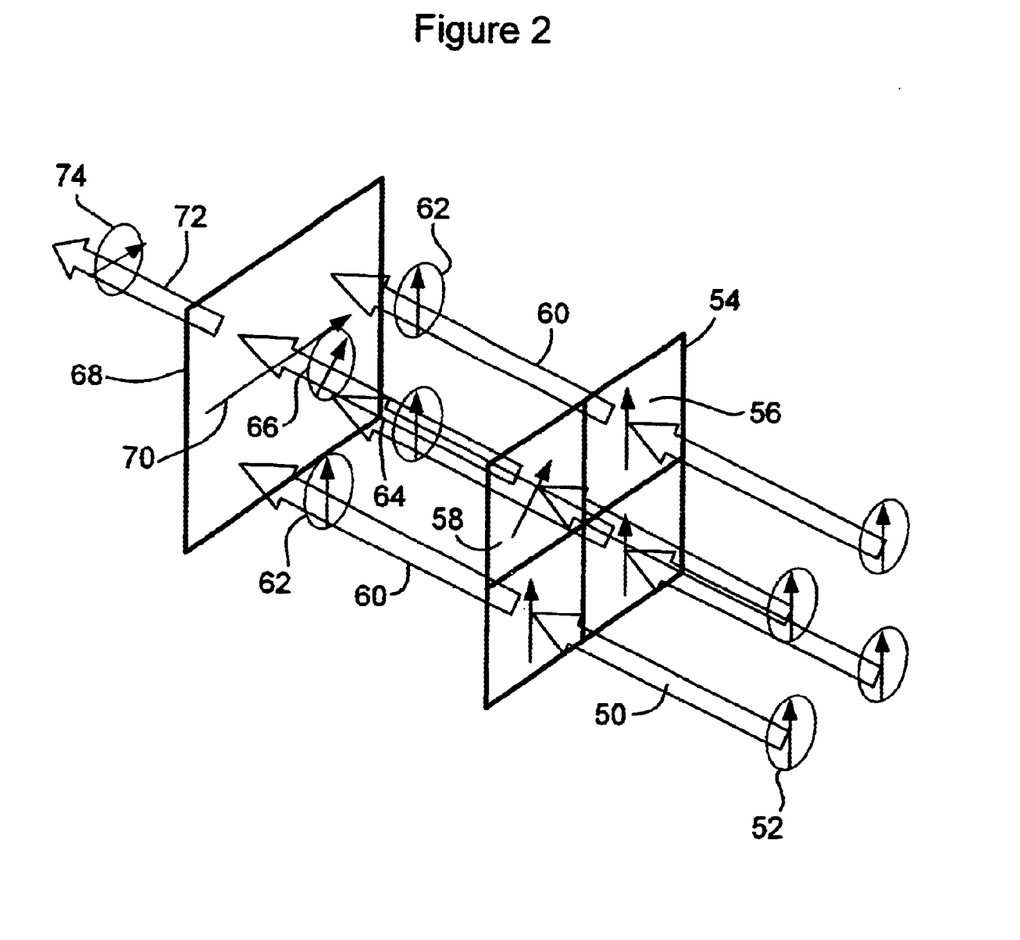
FIG. 2 depicts a light modulator as the one used in the apparatus of FIG. 1.

Reference is now made to FIG. 2, illustrating a disintegrated view of a light modulator suitable for the apparatus of FIG. 1. The spatial light modulator in FIG. 2 consists an LC array 54, comprising a plurality of separately controllable cells, each initially of similar polarization rotation 56, which is positioned laterally across the plurality of secondary beams 50, all having initial polarization 52. For the purpose of clarity the polarization of each light beam is represented in the form of an arrow (56, 58, etc.) whose direction represents the polarization vector associated with that particular light beam.

The spatial light modulator in FIG. 2 is made up of an array of polarization plane rotating elements that can be separately (independently) controlled by the light modulator control unit 9 (See FIG. 1) and a polarizer filter 68. By rotating the polarization planes 56 of the secondary beams 60 it is possible to change the intensity of each beam passing through polarizer filter 68. The array of polarization plane rotating cells 54, together with the polarizer filter 68 can either attenuate, transmit or block the light irradiated on it, according to the command it receives from the light modulator control unit 9. Only a polarization rotated beam 64, which has some polarization vector 66 parallel to the polarization plane 70 of polarizer filter 68, will be transmitted 72 through the polarizer filter 68 with its resulting polarization plane 74 parallel to the polarization plane 70 of the polarizer filter 68 (Although at a reduced intensity). All other beams 60 with non-rotated polarization planes 62 will be effectively blocked by the polarizer filter 68. Such high-speed spatial light modulator consisting of an LC array combined with a polarizer filter can be custom-made and obtained, for example, from Central Research Laboratories (CRL) Ltd., Hayes, Middlesex, UK. In principle, the high-speed LC array are based on ferroelectric LC technology, and comprise an array of LC cells that are each controlled and may be switched to the polarization plane rotated mode thus changing the transmittance of the system's "cell—polarizing filter" from transparent to opaque.

It is evident that the light modulator attenuates the intensity of the traversed light, and therefore, in cases where optical breakdown is required, this reduction of light intensity must be taken into account, i.e. the intensity of the incoming light beam must be high enough for the outgoing light beams to come out with enough energy to be able to achieve optical breakdown. This also means that if the optical machining apparatus is designed for optical breakdown utilities, the light modulator elements do not necessarily have to provide full blockage of light, for allowing light of intensity lower than the threshold intensity required for optical breakdown practically means that the modulator is "opaque" with respect to optical breakdown purposes. This leads to the possibility of tilting the polarization direction of the light modulator in less than 90 degrees (or 45 degrees as in the embodiment of FIG. 2), hence faster response times may be obtained.

It is noted here that any other type of light modulator array can replace the LC array of the embodiment of FIG. 1, as long as it performs similarly. In other words, any array of separately controllable elements, that may each be switched from transparent to opaque with reference to the light irradiated on the array (i.e. letting light through in the transparent mode and blocking the light in the opaque mode) may be suited for the job, and hence is covered by the scope of the present invention. By "opaque" it is meant in, the context of the present invention, any deterioration in the intensity of light passing through the light modulator array so that it gets below the intensity required for the light to perform the task it is designed for (for example, cause optical breakdown or cut through the material of the workpiece). For example, typical damage threshold for fused silica are about 200 J/cm$^2$ for 10 ns, 10 J/cm$^2$ for 30 ps and 3 J/cm$^2$ for 100 fs pulses (An-Chun Tien et al Phys.Rev. Letters, v.82, pp.3883–3886, 1999).

Optionally an angular beam scanner 4 is provided, positioned to intercept the light beams 24 escaping from the light modulator array 3. The angular beam scanner may be, for example, galvanometer scanner, piezo-optical scanner, or acousto-optical scanner. The angle beam scanner can deflect the light beams that reach it, so as to widen the work area of the beams and enhance the flexibility of the apparatus increasing the span and coverage of the light beams. Angular beam scanner 4 is controlled by angle beam control unit 10, which activates the angle beam scanner to deflect the light beams in the desired direction. It is emphasized that the angle beam scanner is an optional feature that may be omitted in other embodiments of the present invention.

Finally a focus lens array 5 is positioned in a predetermined position, aligned with the rest of the optics, so as to focus each of (or at least some of) the beams 26 emerging from the angle beam scanner 4, having a predetermined focus 30 so as to facilitate the processing of the workpiece 6. Generally this means that the focus would be designed to overlap the surface 32 of the workpiece, facing the optics of the apparatus, or facilitate penetration of the focused light beams 28 into the workpiece 6. The microlens array may be an array of refractive or diffractive lens.

A moving, motor-driven, XYZ stage 7, which can be maneuvered to reposition in space with respect to the optics of the apparatus is provided, generally positioned in front of the optics of the apparatus. The stage may be moved in one, two or three dimensions (preferably in three dimensions, so as to allow spatial accessibility for the light beams, and also speed up the process of machining of the workpiece, as the workpiece is quickly moved to a desired position and there those light beams that are focused on the workpiece may perform their task. Generally the moving stage would be actuated to reposition the workpiece between a single, or a sequence, of actuation of the secondary beams. The reposition of the workpiece is aimed at accessing different parts of the workpiece in cases where the overall job is larger than the span of the entire secondary beam bundle. Resolution of this stage should be typically about 0.1–1.0 µm, repeatability about 0.1–1.0 µm and travel distance about 10 cm. Such stage may be obtained, for example, from PI, Newport and other companies.

The workpiece, which the apparatus of the present invention is designed to process, may be a transparent dielectric, semiconductor or any other item that is suited for machining using the apparatus of the present invention.

Control unit 8 is preferably a computerized controller that is adapted to activate and coordinate the operation of light modulator array 3, angular beam scanner 4 and moving stage 7 and laser source 1.

Control unit 8 may be governed by software, setting the desired commands and order of operation of the controlled elements of the apparatus, so as to perform a predetermined task such as forming an image inside a transparent workpiece, or machining a silicon wafer to form a semiconductor of a predetermined shape.

Optional user interface 34, such as a keyboard, touch screen or the like, is provided for inputting commands to the control unit 8.

In a preferred embodiment of the apparatus of the present invention, the energy efficiency and productivity are greatly increased with respect to prior art apparatus. If, for example, 1 kHz repetition rate ultrafast laser is used in combination with computer-controlled 30×30 matrix spatial light modulator and fast angle beam scanner, it allows to produce up. to the order of 10$^6$ damage spots per second.

It is important to note that while in the embodiment of FIG. 1 the secondary light beams are arranged in a parallel configuration, a person skilled in the art may design an embodiment of the present invention manipulating non-parallel secondary beams—be it the beams that leave the beam splitter, the light modulator array or the angular beam scanner—that would still be covered by the scope of the present invention.

Generally the apparatus of the present invention provides a fast responsive and yet more accurate means for optical machining, which is superior to multiple beam apparatus, whose beams are controlled mechanically (such as described in U.S. Pat. No. 6,037,564, or U.S. Pat. No. 4,950,862 that describes a single beam mechanical manipulation).

Furthermore, separate control over each of the beams is achieved, allowing assigning each beam a separate task, as opposed to the parallel performance of the light beams in the apparatus shown in U.S. Pat. No. 5,521,628, thus combining the overall performance of the apparatus to accomplish sophisticated and complex tasks, such as assigning each beam a part of a complete image that is to be imprinted in a glass block, or assign each beam a part of the shape that is to be engraved (or cut, or drilled, or ablated) on a silicon workpiece, or any other machining task on any type of workpiece.

It is noted that although in the embodiment of FIG. 1 there are three separate control units (9, 10, 11 and 8) for controlling the light modulator array 3, the angular beam scanner 4, the moving stage 7, and a main controller governing these control unit, a person skilled in the art may easily design a single multi-tasking controller to replace these control units, and that would be also covered by the scope of the invention.

It is estimated that the time required to accomplish a complex machining task, by an apparatus according to the present invention, would be significantly shortened, with respect to the time it would take any of the prior art optical machining apparatus to complete the same task.

Figure 3:
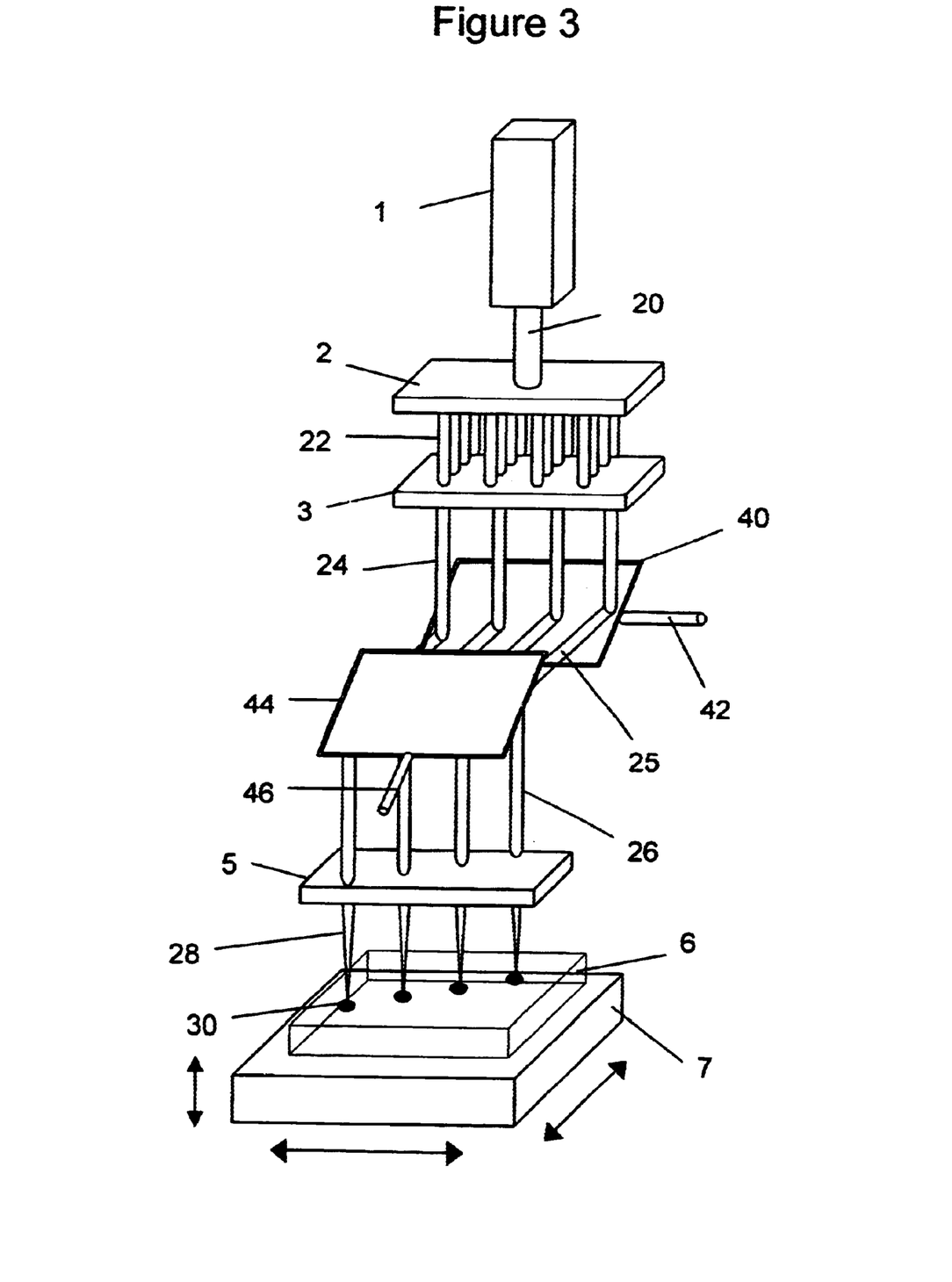
FIG. 3 is a three-dimensional illustration of the optical system of an apparatus for laser machining in accordance with the present invention.

FIG. 3 is a three-dimensional illustration of the optical system of an apparatus for laser machining in accordance with the present invention. Note that in this embodiment the angle beam scanner comprises a pair of galvanic mirrors (40, 44, each rotatable about an axis 42, 46 respectively), thus deflecting the plurality of secondary beams 24 in a direction 25.

Figure 4:
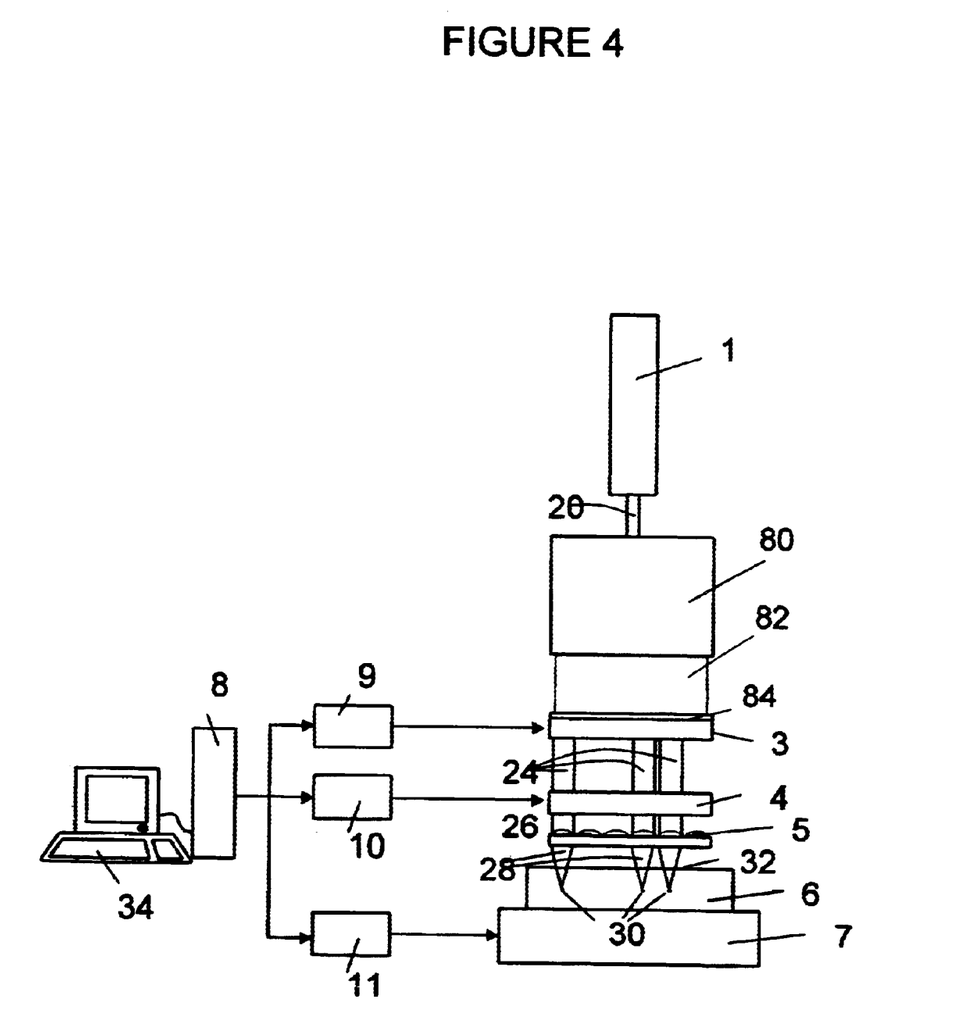
FIG. 4 illustrates another preferred embodiment of an apparatus for laser machining with individually controllable multiple beams, in accordance with the present invention.

FIG. 4 illustrates an alternative embodiment of an apparatus for laser machining with individually controllable multiple beams, in accordance with the present invention. This embodiment differs from the embodiment of FIG. 1 only in the input of the primary laser beam. Instead of splitting the primary laser beam into a plurality of secondary beams using a beam splitter, the primary laser beam 20 is expanded laterally using a beam expander 80, which expands the primary laser beam laterally 81 so that it covers the LC array. The light modulator is than effectively acting not only as modulator but also as a "splitter", for it splits the primary laser beam into a plurality of secondary beams (those who traverse through the light modulator). The rest of the apparatus is identical to the one shown in FIG. 1.

As the LC array is made up of LC elements electrically connected to the controller, and their electric connections are laid around the margins of each LC element, these connections may be damaged by the incidental powerful laser irradiation, a mask 82, in the form of framed array of windows is optionally provided to cover the electronic components of the LC array, so as to prevent damage resulting from excessive laser irradiation. The mask may comprise black paint, metalized coating or any similar protection arrangement. This mask may be also implemented in the embodiment shown in FIG. 1, or, in fact, in any other embodiment of the present invention.

It should be clear that the description of the embodiments and attached Figures set forth in this specification serves only for a better understanding of the invention, without limiting its scope as covered by the following Claims.

It should also be clear that a person skilled in the art, after reading the present specification could make adjustments or amendments to the attached Figures and above described embodiments that would still be covered by the following Claims.

What is claimed is:

1. An apparatus for laser machining for optically machining a workpiece, the apparatus comprising:
    a plane polarized laser beam source adapted to generate a primary plane polarized light beam;
    a beam splitter, adapted to split the primary light beam into a plurality of secondary light beams;
    a light modulator array, comprising an array of individually controllable elements that are each adapted to be set to either allow each beam of the plurality of secondary light beams to traverse through, or effectively block it;
    a microlens array, comprising an array of microlens elements foci of predetermined lengths, said microlens array elements corresponding to the elements of the light modulator array so that light beam passing through an element of the light modulator array is focused by a corresponding element of the microlens array; and
    control means adapted to independently switch each of the elements of the light modulator between a transparent and opaque modes in a predetermined manner.

2. The apparatus according to claim 1, further comprising support means for supporting the workpiece during operation.

3. The apparatus according to claim 2, further comprising repositioning means for repositioning the workpiece, and wherein said control means is also adapted to operate the repositioning means so as to reposition the workpiece between desired positions.

4. The apparatus according to claim 3, wherein said repositioning means comprise motor-driven moving stage.

5. The apparatus according to claim 4, wherein said motor-driven moving stage is computer-controlled.

6. The apparatus according to claim 1, wherein the intensity of the light beams focused by the apparatus on the workpiece is sufficient to cause optical breakdown in the workpiece.

7. The apparatus according to claim 1, wherein said laser beam source is a continuous wave laser.

8. The apparatus according to claim 1, wherein said laser beam source is a pulsed laser.

9. The apparatus according to claim 8, wherein the pulse duration is in the order of $10^{-9}$ seconds or shorter.

10. The apparatus according to claim 1, wherein the light modulator array is a LC-based array.

11. The apparatus according to claim 6, wherein said LC-based array is computer-controlled.

12. The apparatus according to claim 1, further comprising beam steering scanner positioned between said light modulator array and microlens array, so as to steer the secondary light beams thus increase the work span of the apparatus.

13. The apparatus according to claim 12, wherein said beam steering scanner is a galvanometer scanner.

14. The apparatus according to claim 12, wherein said beam steering scanner is a piezo-optical scanner.

15. The apparatus according to claim 12, wherein said beam steering scanner is an acousto-optical scanner.

16. The apparatus according to claim 1, wherein the microlens array comprises an array of refractive lenses.

17. The apparatus according to claim 1, whereiri the microlens array comprises an array of diffractive lenses.

18. The apparatus according to claim 1 further provided with user interface for inputting user commands to the control means.

19. The apparatus according to claim 18, wherein said user interface comprise a keyboard.

20. The apparatus according to claim 18, wherein said user interface comprise a touch screen.

21. The apparatus according to claim 1, wherein the light modulator array is further provided with a mask in the form of a framed array of windows to protect electronic connections of the array.

22. The apparatus according to claim 21, wherein the mask comprises paint or metalized coating.

23. An apparatus for laser machining for optically machining a workpiece, the apparatus comprising:
    a plane polarized laser beam source adapted to generate a primary plane polarized light beam;
    a beam expander, adapted to expand the primary light beam laterally;
    a light modulator array, comprising an array of individually controllable elements that are each adapted to be set to either allow portion of the primary light beam to traverse through, or effectively block them;
    a microlens array, comprising an array of microlens elements with foci of predetermined lengths, said microlens array elements corresponding to the elements of the light modulator array so that light beam passing through an element of the light modulator array is focused by a corresponding element of the microlens array; and
    control means adapted to independently switch each of the elements of the light modulator between a transparent and opaque modes in a predetermined manner.

24. A method for laser machining of a workpiece, comprising:
    providing a plane polarized laser beam source;
    providing a light modulator array, comprising an array of individually controllable elements that are each adapted to be set to either allow a single beam of plurality of light beams to traverse through, or effectively block it;
    providing focusing means for the light beams emerging from the light modulator array;

splitting said laser beam to a plurality of secondary light beams;

irradiating the plurality of secondary light beams onto said light modulator array, and switching each of the elements of the light modulator array between transparent and opaque modes in a predetermined manner; and focusing light beams emerging from said light modulator array on the workpiece.

25. The method according to claim 24, further comprising repositioning the workpiece in a predetermined manner, so as to increase the processed zone of the workpiece.

* * * * *